Patented Nov. 30, 1926.

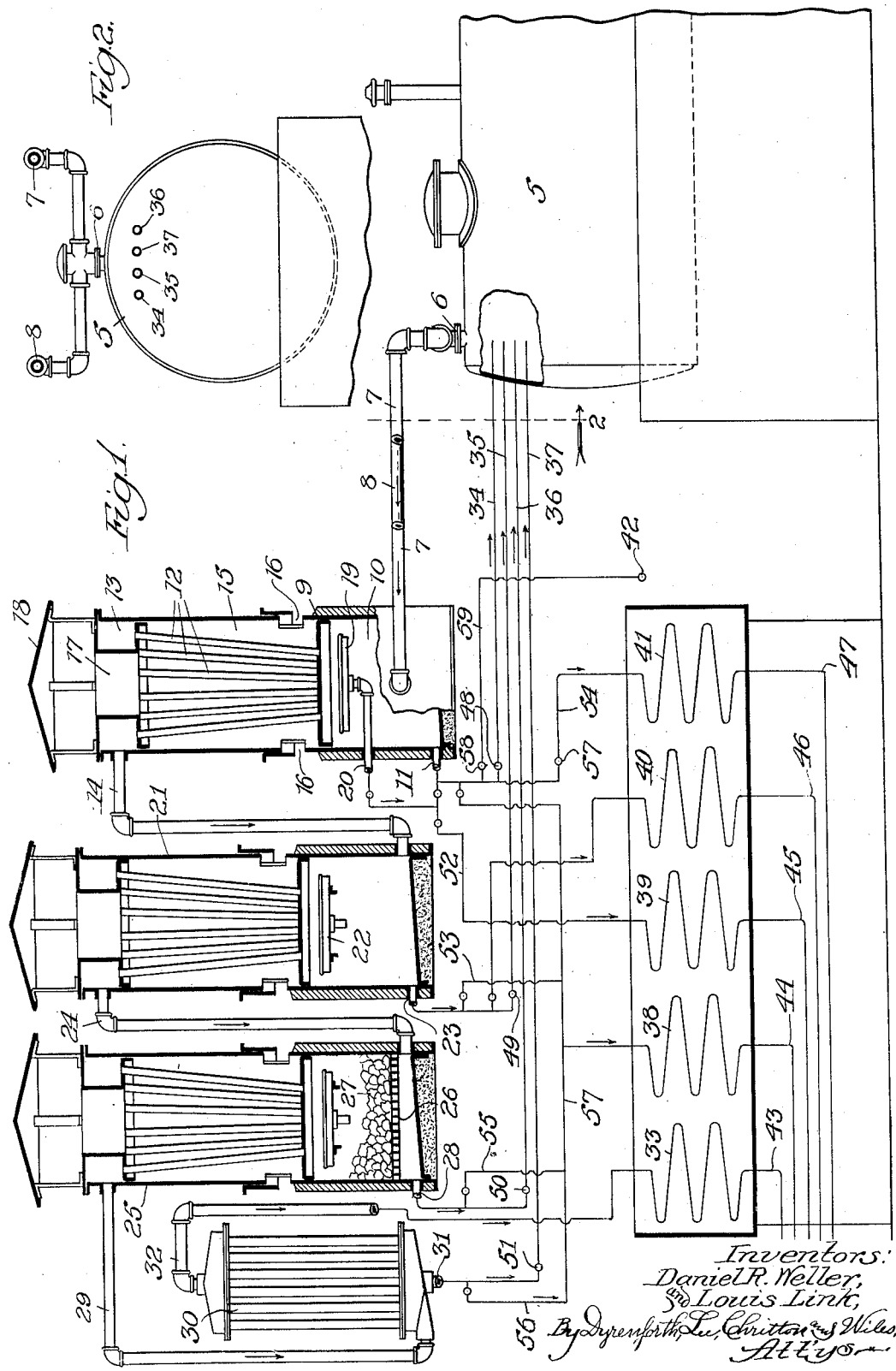

1,609,007

UNITED STATES PATENT OFFICE.

DANIEL R. WELLER AND LOUIS LINK, OF BATON ROUGE, LOUISIANA, ASSIGNORS TO STANDARD DEVELOPMENT COMPANY, A CORPORATION OF DELAWARE.

DISTILLATION OF OILS.

Application filed Novemebr 12, 1920. Serial No. 423,504.

The present invention relates to the distillation of petroleum oils, and more particularly to such distillation in connection with a fractional separation of the vapor constituents issuing from the distillatory apparatus during the complete distillation of a single charge or batch of crude oil. It will be fully understood from the following specification, illustrated by the accompanying drawing, in which:

Fig. 1 is a diagrammatic view of apparatus shown partially in section, suitable for carrying out the invention, and Fig. 2 is an end view on the line 2, of Fig. 1, showing a rear end elevation of the still.

Referring more particularly to the drawings, the numeral 5 indicates a still, for example, a horizontal cylindrical still, which is provided with a vapor outlet 6 to which two vapor lines 7 and 8 are connected. These vapor lines communicate with a tower-like fractional condenser, indicated by the numeral 9, opening into a chamber 10 provided in the base thereof. This chamber drains to an outlet pipe 11, the connections of which to the system of condenser and run-back lines will be hereinafter more particularly described. A plurality of tubes placed in oblique or outwardly flaring position 12 carry the vapors from the base chamber 10 to an annular chamber 13 in the top of the tower 9, and from the chamber 13 they issue through vapor line 14. The pipes or tubes 12 are cooled by air which enters the central chamber 15 of the tower, in which the tubes 12 are located, through the air inlet or dampers 16. The air makes its exit from the central chamber 15 through the central opening 17 which is protected by the hood or cover 18. A pan 19 is arranged within the base chamber 10 to collect the condensate dripping from the tubes 12, and this condensate drains through pipe 20, which is connected with the condenser and a run-back line.

The uncondensed vapors issuing from the annular chamber 13 of tower 9 pass through pipe 14 into the base chamber of a tower 21, which differs in construction from the tower 9 only in that the pan 22 in the base chamber of the tower, which collects the condensates from the air-cooled tubes, drains directly into the base chamber. The total condensate from the tower 21 drains therefrom through outlet pipe 23, and the uncondensed vapors issue through vapor pipe 24 into the base chamber of the tower 25. The construction of the tower 25 is substantially the same as that of the tower 21, with the addition of a perforated grid 26 in the base chamber of the tower above the inlet of the pipe 24, and a layer of packing stones 27 supported thereupon. The entire condensate in the tower 25 discharges through the outlet pipe 28. The vapors issue therefrom through the vapor pipe 29, passing into the lower manifold of a radiator or tubular air condenser 30. The condensate from this condenser drains through outlet pipe 31, and the vapors issuing therefrom through pipe 32 pass directly into the condenser or worm 33 for light products. In the drawing the connection from the various outlets of the towers are indicated as single lines, the position of the control valves therein being shown by circles.

The lines or piping is so arranged that the condensate or reflux formed in the towers 9, 21, 25 and the condenser 30 may be returned to the still through run-back lines 34, 35, 36 and 37 respectively or may be diverted to one or another of the cooling worms 38, 39, 40 or 41. The outlet 20 from the pan 19 is so connected with the lines that the condensate from the tubes 12 in the first tower 9 may be returned to the still through the run-back 34 or may be passed into one of the cooling worms. A still wax line 42 is likewise provided, which may be connected with the outlet 11 in the base chamber of the tower 9.

The condenser 33 and the cooling worms 38, 39, 40 and 41 are connected with suitable receiving chambers (not shown) by the lines 43, 44, 45, 46 and 47 respectively.

In order that the invention may be clearly understood, it is hereinafter described in connection with the distillation of a charge of mid-continent crude petroleum, which may have, for example, a gravity of 35° Baumé. A charge of such petroleum, for example, 1100 barrels of 42 gal. is fed into the still, which is then fired. During the initial firing of the still the run-back lines 34, 35, 36 and 37 are all closed by means of the valves 48, 49, 50 and 51 respectively, and the condensates from the several fractional condensers are permitted to pass through the worms into the receiving tanks.

This condition of operation is maintained until the water in the still charge has been completely removed, that is, until a still temperature of about 250° F. is attained. During this period the light naptha vapors forming the greater part of the vapors evolved, pass through the entire condensing system and issue through vapor outlet 32 from the radiator condenser 30, passing through the condenser worm 33 from which the condensed naphtha flows through the line 43 to the receiving house. When the water has been completely removed, the still temperature being approximately 250° F., the run-back lines from the condensers 9, 21, 25 and 30 are opened, the lines to the coils or worms 38, 39, 40 and 41 being closed. Under these conditions the natural naphtha of the crude passes through the entire system of condensers, and issues through outlet pipe 32 into worm 33 where it is condensed. Operation is continued in this manner with frequent observation of the gravity of the stream of naphtha issuing from the worm 33 until its gravity indicates the formation of a product heavier than the desired naphtha fraction, at 48° Baumé for example. At this time substantially all of the natural naphtha contents of the crude will have been removed, and by reason of the fractional condensation of the heavier vapors in the four towers or condensers and their return to the still and re-distillation therein, the naphtha fraction will be cleanly separated from the other fractions of the oil.

When the stream of condensate issuing from the worms 33 is of about 48° Baumé gravity in the present example, the stream is diverted to the kerosene or burning oil receiver. The remaining connections of the apparatus remain as before. The distillation is continued with these connections until the gravity of the stream of condensates becomes about 39° Baumé. This fraction of the distillate is substantially a commercial kerosene requiring only a light treatment with sulfuric acid and alkali to convert it into a merchantable oil. The cleanness of separation between the natural naphtha and the kerosene distillate is evidenced by the high flash point of the kerosene distillate (138 to 144° F.) and by the low dry point of the naphtha distillate (about 404° F.) as compared with the dry point of the naphtha distillate of the same gravity ordinarily secured by the prior art processes (about 438° F.). The clean separation between the kerosene distillate and the heavier constituents of the crude is indicated by its low viscosity (395 Saybolt) and by its low dry point (about 564° F.) as compared with the corresponding distillate of like gravity handled in the usual manner (about 608° F.). Actual inspection tests upon the naphtha and kerosene fractions obtained in accordance with the present process show for average samples the following results:

*Naphtha fractions.*

Gravity, 55.6 Baumé; initial boiling point, 164° F.; 90% off at 376° F.; dry point, 404°.

*Kerosene fractions.*

Gravity, 42.9° Baumé; flash, 138° F.; burn, 172° F.; color, 17; viscosity, 395 Saybolt; initial B. P., 342° F.; 90% over 489° F.; dry point, 564° F.

When the gravity from the condensate issuing from the worm 33 reaches 39° Baumé, it is diverted into a separate receiver, and is there collected until a still temperature of about 700° F. is attained. This distillate, which may be called heavy white distillate, shows by its inspection a sharp separation from the paraffine distillate and likewise from the residue in the still. It is especially suited for the production of special high viscosity and high flash test products, such as that known to the trade as mineral seal distillate. This heavy white distillate may be re-distilled to produce refined distillates and mineral seal oil, in which case an average sample shows a yield of approximately 42% refined distillate, 50% of mineral seal oil and about 8% of residuum.

When the still temperature reaches 700° F., the run-back line from the first tower 9 is closed and the total condensate from the base chamber 10 and the pan 19 of this tower are conducted through the line 52 and the cooling worm 39 to the line 45 running to the receiving tank. The run-back lines 35, 36 and 37 from the towers 21 and 25 and the radiator condenser 30 are still kept open to return the condensate from these towers to the still. This arrangement is continued for a period of about three hours, and during this time, the still temperature being above 690°, cracking takes place therein. The condensate issuing from the condenser 33 increases its Baumé gravity, being in the nature of a cracked distillate. The cracked distillate issuing from the condenser 33 is collected in a separate receiving tank.

During this period the condensate from the pan and base chamber of the tower 9 is a paraffine distillate of excellent color, high viscosity and high flash point and has high wax contents. In an actual distillation this paraffine distillate showed the following inspection tests:

Gravity, 27.6° Bé.; flash, 320° F.; viscosity, 85 Saybolt; chill, 80°; initial B. P., 418° F.; 50% off 680° F.

At the end of this period the still contents have attained a temperature (about 725-730° F.) such that vapors are evolved which contain fractions undesirable for paraffine distillates (tarry materials and amorphous wax, for example). These materials condense in the base chamber of the tower 9. The condensates from the tubes 12 of the tower 9 which is collected in pan 19 and that from the base chamber 10 containing these undesirable constituents are therefore separated, that from the base chamber being returned to the still through the run-back 34 while that from the pan 19 continues to pass through line 52 and cooling worm 39 to the receiving house as paraffine distillate. The distillation proceeds in this manner for a further period of two or three hours, the stream of paraffine distillate from the pan 19 increasing in density to approximately 27.4° Baumé gravity. At the end of this period the condensate from the second tower 21 is cut off from the run-back line 35 and is caused to pass through the line 53, the cooling worm 38 and the line 44 to a receiving tank. The distillate from the tower 21 is likewise a paraffine distillate of excellent color and of lighter gravity than the stream of paraffine distillate produced as a condensate in the tubes 12 of the tower 9. This arrangement is continued during the distillation of the oil for about two hours, two streams of paraffine distillate being obtained during this period. At the end of this period of about two hours the density of the stream of heavy distillates issuing from the cooling worm 38 has attained a high density (about 24° Baumé), after which point its contents of amorphous wax increases rapidly. At this point the line 52 to the worm 39 is closed, and the run-back line 34 is likewise closed, and the total condensate from the tubes and the base chamber of the tower 9 are caused to pass though the line 54, the worm 41 and the line 47 to a receiving tank as paraffine slop distillate. At the same time the run-back lines 36 and 37 are closed by means of valves 50 and 51, and the condensates from the tower 25 and the radiator condenser 30 are caused to flow through lines 55 and 56 respectively to the line 57 leading to the cooling worm 38. With this arrangement the distillation is continued for a period of about two hours, or until the paraffine slop distillates issuing from worm 41 increases in density to about 12° Baumé gravity. The three streams of distillate formed as condensates in the towers 21 and 25 and in the radiator condenser 30 all pass through the worm 38 as paraffine distillate. By this time the charge in the still is reduced practically to dryness and the distillate is substantially only a still wax. The condensate from the first tower is now cut off from the slop worm 41 by closing the valve 57, and the valve 58 is opened, permitting the said condensate to pass through line 59 to the wax line 42. Firing is stopped and coking of the still continues from a quarter to a half of an hour after this connection to the wax line is established. About three and one third per cent by weight of an excellent quality coke is produced in the example given, only a very thin layer of dense coke being formed against the surface of the still.

Although the present invention has been described in connection with its use in the distillation of a particular type of crude petroleum, it is readily apparent that it may be employed for the distillation of other types of oil. In any case it produces a clean separation of the several fractions or distillates by the repeated fractional condensation, refluxing and redistillation of the intermediate fractions. Furthermore, the present process permits of the separate removal of intermediate fractions of the distillate, or the removal of separated fractions of distillate while returning to the still the intermediate fractions.

By varying the manipulation of the run-backs and condensers a given cut or fraction of distillate may be taken off in any one or more of the condensers. Thus, instead of taking off paraffine distillate in the first tower 9, as above described, the condensate there may be returned to the still and the paraffine distillate taken off from the second or second and third towers. By varying the operation of the system to produce different cuts or fractions of distillate in different towers, the yield of any given distillate and of coke may be varied at will, the variations in yield so produced being probably due, in part at least, to the different still temperatures at which a given distillate is taken off under varying conditions of operation of the condensers. The great flexibility of the system is accompanied by high speed of operation, as the period necessary for running a crude to coke is reduced from 25 to 40% as compared with prior practice.

It is not intended that the specific details of the apparatus and process described herein shall be regarded as limitations on the scope of the invention, except in so far as included in the accompanying claims.

We claim:

1. The process of fractional distillation and condensation of crude petroleum which consists in heating a body of oil, subjecting the vapors to a succession of fractional condensations, the condensate from each of said condensations being returned to the still out of contact with the vapors undergoing condensation and out of contact with other condensates in the preceding condensation step or steps, and separately condensing and collecting the vapors passing uncondensed through the said succession of condensations.

2. The process of fractional distillation and condensation of crude petroleum which consists in heating a body of oil to progressively higher temperatures, subjecting the vapors to a succession of fractional condensations, returning the condensate from each of said condensations to the still out of contact with the vapors undergoing condensation in the preceding condensation step or steps and out of contact with other condensates, condensing and collecting the vapors passing uncondensed through the said succession of condensations, the resulting condensate being divided into cuts in accordance with its gravity, continuing the distillation until the cracking temperature is exceeded, and thereupon diverting and collecting separately the paraffin distillate formed as condensate in one of the first of the succession of condensations.

3. The process of fractional distillation and condensation of crude petroleum which consists in heating a body of oil at a temperature capable of effecting cracking thereof, subjecting the vapors to a succession of fractional condensations, wherein wax containing distillates are condensed in the first two of said condensations, collecting together said wax containing condensates formed in said condensations, separately returning the condensates from each of the other condensations to the still out of contact with the vapors undergoing condensation in the preceding condensation step or steps, and condensing and collecting as cracked light distillate the vapors passing uncondensed through the said succession of condensations.

4. The process of fractional distillation and condensation of crude petroleum which consists in heating a body of oil at a temperature capable of effecting cracking thereof, subjecting the vapors to a succession of five fractional condensations, wherein wax containing distillates are condensed in the first two condensations, collecting together said wax containing distillates formed in said condensations, separately returning the condensates from each of the other condensations to the still out of contact with the vapors undergoing condensation in the preceding condensation steps, continuing such operation until amorphous wax is present in the first condensate, then returning the first condensate alone to the still while continuing to collect the second condensate, separately returning the condensates from each of the other condensations to the still out of contact with the vapors undergoing condensation in the preceding condensation step or steps and separately condensing and collecting during the entire period the vapors passing uncondensed through the said succession of condensations.

5. The process of fractional distillation and condensation of crude petroleum which consists in heating a body of oil at a temperature capable of effecting cracking thereof, subjecting the vapors to a succession of five fractional condensations, wherein wax containing distillates are formed in the first two of said condensations, collecting together said wax containing distillates formed in said condensations, separately returning the condensates from each of the other condensations to the still out of contact with the vapors undergoing condensation in the preceding condensation steps, continuing such operation until amorphous wax is present in the first condensate, then returning the first condensate alone to the still while continuing to collect the second condensate, separately returning the condensates from each of the other condensations to the still out of contact with the vapors undergoing condensation in the preceding condensation step or steps until a wax bearing distillate is formed as condensate in the subsequent condensations, and diverting and collecting such distillates as formed while separately collecting as slop such distillates as have a density greater than that equivalent to 24° Bé.

DANIEL R. WELLER.
LOUIS LINK.